(12) United States Patent  (10) Patent No.: US 11,909,243 B2
Thompson et al.  (45) Date of Patent: Feb. 20, 2024

(54) INFORMATION HANDLING SYSTEMS AND IMPROVED BATTERY CHARGE CONTROL METHODS (71) Applicant: DELL PRODUCTS L.P., Round Rock, TX (US)

(72) Inventors: Richard C. Thompson, Cedar Park, TX (US); Karunakar P. Reddy, Austin, TX (US); Yan Ning, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1430 days.

(21) Appl. No.: 16/101,946

(22) Filed: Aug. 13, 2018

(65) Prior Publication Data
US 2020/0052519 A1 Feb. 13, 2020

(51) Int. Cl.
*H02J 7/00* (2006.01)
*H01M 10/48* (2006.01)
(Continued)

(52) U.S. Cl.
CPC .......... *H02J 7/0071* (2020.01); *H01M 10/48* (2013.01); *H02J 7/02* (2013.01); *H01M 10/4257* (2013.01); *H02J 7/00034* (2020.01)

(58) Field of Classification Search
CPC .... H02J 7/0088; H02J 7/0078; H02J 7/00034; H02J 7/02; H02J 7/0071; H02J 7/00;
(Continued)

(56) References Cited

U.S. PATENT DOCUMENTS 5,780,992 A * 7/1998 Beard .................. H01M 10/48
 320/DIG. 12
7,378,819 B2 5/2008 Wang et al.
(Continued)

FOREIGN PATENT DOCUMENTS

CA 2925751 A1 * 4/2014 ........... G06F 1/1628
CA 3036785 A1 * 5/2020 .......... H02J 7/00714
(Continued)

OTHER PUBLICATIONS

"IEEE Standard for Rechargable Batteries for Portable Computing," in IEEE Std 1625-2004 , vol., No., pp. 0_1-, May 28, 2004, doi: 10.1109/IEEESTD.2004.243226. (Year: 2004).*

*Primary Examiner* — M Baye Diao
(74) *Attorney, Agent, or Firm* — Egan, Enders & Huston LLP.

(57) ABSTRACT

Embodiments of information handling systems (IHSs) having rechargeable batteries and improved battery charge control methods are provided herein. For example, a method is disclosed for dynamically switching between a plurality of battery charging profiles, each having different recharge thresholds and charge termination thresholds for controlling battery recharge. Such a method may include detecting discharge current from a rechargeable battery of an IHS, determining whether or not the IHS is coupled to an external power source, and switching from using a first battery charging profile to using a second battery charging profile to recharge the rechargeable battery in response to detecting the discharge current while the IHS is coupled to the external power source and/or determining that the discharge current is a short term supplemental power event.

12 Claims, 6 Drawing Sheets

(51) Int. Cl.
*H02J 7/02* (2016.01)
*H01M 10/42* (2006.01)

(58) Field of Classification Search
CPC ............. H02J 7/007188; H02J 7/00714; H02J 7/00716; H02J 7/00718; H01M 10/4257; H01M 2220/30; H01M 10/44; H01M 10/48; Y02E 60/10
USPC .......................................................... 320/137
See application file for complete search history.

(56) References Cited

U.S. PATENT DOCUMENTS

| | | | |
|---|---|---|---|
| 7,391,184 B2 | 6/2008 | Luo et al. | |
| 7,557,538 B2 * | 7/2009 | Yau | H02J 7/0016 320/122 |
| 8,058,840 B2 * | 11/2011 | Daniel | H01M 10/46 320/112 |
| 8,138,722 B2 | 3/2012 | Wang et al. | |
| 8,396,609 B2 * | 3/2013 | Wang | H02J 7/0013 429/432 |
| 8,421,414 B2 * | 4/2013 | Lee | G06F 1/263 320/132 |
| 8,464,079 B2 * | 6/2013 | Chueh | G06F 1/263 323/299 |
| 8,479,024 B2 | 7/2013 | Vichare et al. | |
| 8,683,241 B2 * | 3/2014 | Lin | H02J 9/005 320/132 |
| 8,793,518 B2 * | 7/2014 | Reddy | G06F 1/3212 320/132 |
| 8,854,014 B2 * | 10/2014 | Horie | H02J 7/007182 320/160 |
| 9,015,514 B2 * | 4/2015 | Sultenfuss | G06F 1/28 713/340 |
| 9,201,480 B2 * | 12/2015 | Fischbach | H02J 7/0071 |
| 9,263,912 B2 * | 2/2016 | Verdun | H02J 7/04 |
| 9,300,015 B2 * | 3/2016 | Chang | H01M 10/4257 |
| 9,312,704 B2 * | 4/2016 | Tinaphong | H01R 25/006 |
| 9,312,767 B2 * | 4/2016 | Sandner | H02J 50/10 |
| 9,507,400 B2 * | 11/2016 | Knepper | G06F 1/263 |
| 9,543,783 B2 * | 1/2017 | Soong | H02J 7/00036 |
| 9,753,094 B2 | 9/2017 | Thompson et al. | |
| 9,831,696 B2 * | 11/2017 | Iida | G06F 1/3212 |
| 9,855,376 B2 * | 1/2018 | Bluvshtein | A61M 60/873 |
| 10,008,870 B2 * | 6/2018 | Davison | H04B 1/3883 |
| 10,305,292 B2 * | 5/2019 | Madhavi | H02J 7/342 |
| 10,673,271 B2 * | 6/2020 | Krishnakumar | G06F 1/26 |
| 10,897,144 B1 * | 1/2021 | Patton | H02J 7/0019 |
| 10,931,121 B2 * | 2/2021 | Sethi | H02J 7/00714 |
| 11,086,380 B2 * | 8/2021 | Iyer | G06F 1/3265 |
| 11,243,258 B2 * | 2/2022 | Ramezan Pour Safaei | H02J 7/00712 |
| 11,314,311 B2 * | 4/2022 | Iyer | G06V 40/10 |
| 2007/0279004 A1 * | 12/2007 | Wang | H02J 7/0019 320/128 |
| 2011/0292278 A1 * | 12/2011 | Kurihara | H02J 7/0031 324/427 |
| 2015/0089260 A1 * | 3/2015 | Tsutsui | G06F 1/324 713/320 |
| 2016/0172719 A1 * | 6/2016 | Chang | G06F 1/28 713/340 |
| 2018/0026457 A1 * | 1/2018 | Delevski | H02J 7/0071 320/106 |
| 2018/0062409 A1 * | 3/2018 | Jung | H02J 7/342 |
| 2019/0222045 A1 * | 7/2019 | Dhanapal | H02J 7/007194 |
| 2020/0274383 A1 * | 8/2020 | Lan | H02J 7/0068 |

FOREIGN PATENT DOCUMENTS

| | | | | |
|---|---|---|---|---|
| EP | 3358703 A1 * | 8/2018 | ............. | B60L 53/11 |
| KR | 20170000276 A * | 1/2017 | ............ | H02J 7/0091 |

* cited by examiner

INFORMATION HANDLING SYSTEMS AND IMPROVED BATTERY CHARGE CONTROL METHODS

FIELD OF THE INVENTION

This invention relates generally to information handling systems, and more particularly to improved battery charge control methods and information handling systems (IHSs) utilizing such methods.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems (IHSs) include notebook computers, tablet components, mobile phones and personal data assistants (PDAs). Portable IHSs are typically powered by an external AC power source supplied by an AC adapter when connected to the AC power source (i.e., when the system is "plugged in"), and by rechargeable batteries (e.g., lithium ion or nickel metal hydride battery packs) when disconnected from the AC power source (i.e., when the system is "unplugged"). In some portable IHSs, the rechargeable batteries may be used as a supplemental or dual power source when the IHS is plugged in and connected to the AC power source. For example, rechargeable batteries may provide supplemental power to a plugged in system when the processor enters a turbo boost mode and/or when an undersized AC adapter is used to support the average current consumption of the system.

Portable IHSs implement battery charge control methods to recharge the battery when the system is plugged in to an AC power source. In a typical battery charge control method, the battery is recharged to full power when the remaining state of charge (SOC) drops below a recharge threshold (typically, 95% SOC) or when the battery supplies a significant discharge current (e.g., a discharge current greater than or equal to 150 mA) to system components. With existing battery charge control methods, short duration supplemental power events, such as those that occur during turbo boost and other high discharge rate events, may trigger a battery recharge even though they don't draw a lot of power from the battery. These short duration supplemental power events may cause repeated recharging (or "topping off") of the battery to full charge, which accelerates battery degradation and shortens battery life. This results in the need to replace the batteries more often.

SUMMARY OF THE INVENTION

The present disclosure provides various embodiments of improved battery charge control methods and information handling systems (IHSs) utilizing such methods. In one respect, the present disclosure provides embodiments of improved battery charge control methods that dynamically switch between a plurality of battery charging profiles used to control battery recharge. In some embodiments, disclosed methods may dynamically switch between a first battery charging profile and a second battery charging profile, each having different recharge thresholds and charge termination thresholds for controlling battery recharge.

For example, a first battery charging profile may include a first recharge threshold ($TH_{rc1}$) and a first charge termination threshold ($TH_{ct1}$), and a second battery charging profile may include a second recharge threshold ($TH_{rc2}$) and a second charge termination threshold ($TH_{ct2}$). In some embodiments, the second charge termination threshold ($TH_{ct2}$) may be less than or equal to the first recharge threshold ($TH_{rc1}$). Regardless of particular values chosen, the second recharge threshold is less than the first recharge threshold and the second charge termination threshold is less than the first charge termination threshold. By setting $TH_{rc2}<TH_{rc1}$, the disclosed systems and methods enable the battery to support short duration supplemental power events without triggering a battery recharge as frequently. By setting $TH_{ct2}<TH_{ct1}$, the disclosed systems and methods avoid repeated recharging (or topping off) of the battery, which has been determined to accelerate battery degradation, shorten battery life, and result in the need to replace the batteries more often.

In another respect, the present disclosure provides an embodiment of a battery charge control method for recharging a battery in response to detecting a short duration supplemental power event. As used herein, a "short duration supplemental power event" may occur when supplemental current/power is provided by the battery for a relatively short duration of time. These events may occur, for example, during processor turbo boost and other high discharge rate events, and/or when an undersized AC adapter is used to support the average current consumption of the system.

According to one embodiment, a method is disclosed herein for dynamically switching between a plurality of battery charging profiles, each having different recharge thresholds and charge termination thresholds for controlling battery recharge. Such a method may include, for example, detecting discharge current from a rechargeable battery of an information handling system (IHS), determining whether or not the IHS is coupled to an external power source; and switching from using a first battery charging profile to using a second battery charging profile to recharge the rechargeable battery in response to: detecting the discharge current while the IHS is coupled to the external power source and/or determining that the discharge current is a short term supplemental power event.

In one example embodiment, the second battery charging profile may be used to recharge the rechargeable battery if the discharge current is detected while the IHS is coupled to the external power source. If the discharge current is detected while the IHS is disconnected from the external power source, however, some embodiments of the method may use the first battery charging profile to recharge the rechargeable battery once the IHS is reconnected to the external power source. In other embodiments, an optional characterization step may be performed to characterize battery discharge while the IHS is disconnected from the external power source. In such embodiments, the method may determine if the IHS is connected to the external source via an undersized AC adapter (i.e., an AC adapter that is not sufficient to support peak and/or sustained loads associated with processor turbo boost and other high discharge rate events) and may use the AC adapter ratings and the information gained in the optional characterization step to select a battery charging profile.

In another example embodiment, the method may further include monitoring one or more characteristics of the rechargeable battery, and determining if the discharge current is a short term supplemental power event based, at least in part, on the one or more characteristics. The second battery charging profile may be used to recharge the rechargeable battery if the discharge current is determined to be a short term supplemental power event. If the discharge current is not a short term supplemental power event, however, the first battery charging profile may be used to recharge the rechargeable battery.

According to another embodiment, an information handling system (IHS) as disclosed herein may generally include a rechargeable battery, a battery charger and power circuit and one or more processing devices. The rechargeable battery may include one or more battery cells and a battery management unit (BMU). The battery charger and power circuit may be coupled to receive current from an external power source. When the IHS is coupled to the external power source, the battery charger and power circuit may be coupled to supply a charge current to the one or more battery cells for recharging the rechargeable battery in accordance with a battery charging profile. The one or more processing devices may be configured to execute program instructions to switch from using a first battery charging profile to using a second battery charging profile to recharge the rechargeable battery in response to: detecting a discharge current from the one or more battery cells while the IHS is coupled to the external power source and/or determining that the discharge current is a short term supplemental power event. The first and second battery charging profiles may be generally configured, as set forth above.

In one example embodiment, the one or more processing devices may be configured to execute program instructions to monitor a connection state of the IHS to the external power source, detect a discharge current from the one or more battery cells, determine if the discharge current is detected while the IHS is connected to the external power source, and select a battery charging profile to be used to recharge the battery based said detecting and determining steps. If the discharge current is detected while the IHS is connected to the external power source, the program instructions may be executable to use the second battery charging profile to recharge the rechargeable battery. On the other hand, the program instructions may be executable to use the first battery charging profile to recharge the rechargeable battery, if the discharge current is detected while the IHS is disconnected from the external power source.

In another example embodiment, the one or more processing devices may be configured to execute program instructions to monitor one or more characteristics of the rechargeable battery, detect a discharge current from the one or more battery cells, and determine if the discharge current is a short term supplemental power event based, at least in part, on the one or more characteristics. Although not limited to such, the monitored battery characteristics may include, for example, battery type, model number, manufacturer, charge rate, charge/discharge current, remaining state of charge (SOC), charge termination bit state, temperature and voltage for safe charging, etc. If the discharge current is determined to be a short term supplemental power event, the program instructions may be executable to use the second battery charging profile to recharge the rechargeable battery. On the other hand, the program instructions may be executable to use the first battery charging profile to recharge the rechargeable battery if the discharge current is not a short term supplemental power event.

The one or more processing devices may include one or more of a host processor of the IHS, an embedded controller (EC) of the IHS and a battery management unit (BMU) of the rechargeable battery. In one example embodiment, the BMU may detect discharge current from the one or more battery cells and monitor one or more characteristics of the rechargeable battery. The EC may detect a connection state of the IHS to the external power source, and may communicate with the host processor. The host processor may be configured to receive inputs from the EC and execute the program instructions described above for implementing the disclosed battery charge control methods. In one embodiment, the program instructions executed by the host processor may be a runtime service of boot firmware stored, for example, within a non-volatile computer readable memory of the IHS.

According to yet another embodiment, a method is disclosed herein for recharging a battery in response to detecting a short duration supplemental power event. Such a method may include, for example, monitoring a system workload of one or more IHS components, determining if the system workload exceeds a peak current limit of an alternating current (AC) adapter coupled to supply direct current (DC) power to the IHS, and determining if the rechargeable battery is providing supplemental power to the IHS. For example, the method may include detecting discharge current from the rechargeable battery to one or more IHS components, and determining that the rechargeable battery is providing supplemental power to the IHS if the discharge current is detected while the IHS is coupled to an external power source via the AC adapter.

If the system workload exceeds the peak current limit of the AC adapter and the rechargeable battery is providing supplemental power to the IHS, the method may further include detecting a state of charge (SOC) of the rechargeable battery, determining if the battery SOC is less than a recharge threshold, and supplying charge current to the rechargeable battery to recharge the rechargeable battery if the battery SOC is less than a recharge threshold. In this embodiment, the recharge threshold may be any threshold value between about 75% SOC and 90% SOC, and more preferably, between about 80% SOC and 85% SOC. In some embodiments, the method may reduce one or more power limits specified for a host processor of the IHS, prior to supplying the charge current, to suppress host processor turbo events while the rechargeable battery is recharging.

As the charge current is supplied to the rechargeable battery, the method may detect the battery SOC and determine if the battery SOC has reached a charge termination threshold. As long as the charge termination threshold is greater than the recharge threshold, the charge termination threshold may be any threshold value between about 85% SOC and 95% SOC, and more preferably, between about 90% SOC and 95% SOC. If the battery SOC reaches the charge termination threshold, the method may remove the charge current from the rechargeable battery to disable battery recharge. In some embodiments, the method may increase one or more power limits specified for the host processor, prior to removing the charge current, to enable support for host processor turbo events. If the battery SOC does not reach the charge termination threshold, however, the method may return to the step of determining if the rechargeable battery is providing supplemental power to the IHS.

BRIEF DESCRIPTION OF THE DRAWINGS

Other advantages of the present disclosure will become apparent upon reading the following detailed description and upon reference to the accompanying drawings in which.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Figure 1:
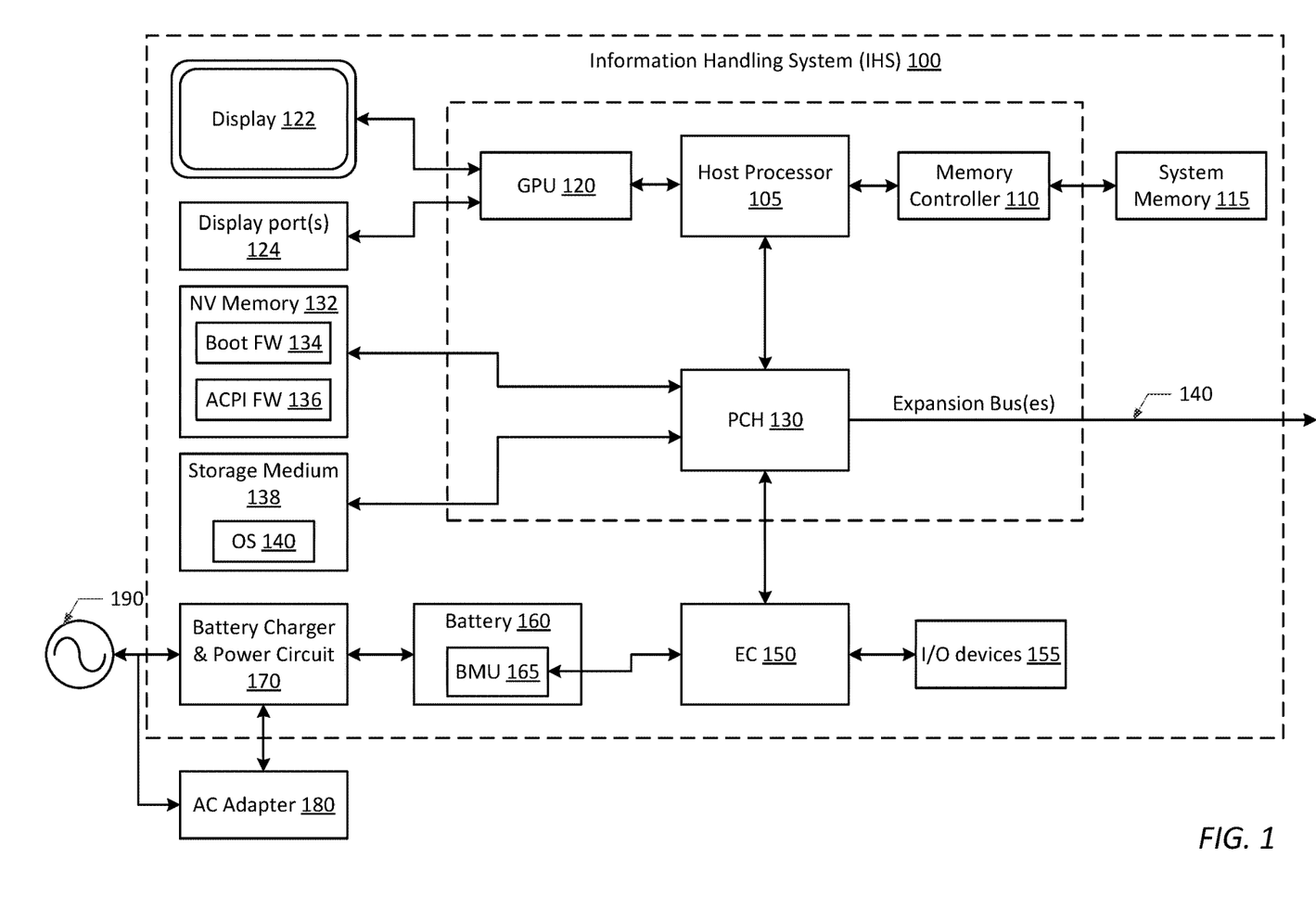
FIG. 1 is a block diagram illustrating one embodiment of an information handling system (IHS) including a rechargeable battery and one or more components adapted to control battery recharging.

FIG. 1 is a block diagram of an information handling system (IHS) 100 as it may be configured according to one embodiment of the present disclosure. As such, FIG. 1 illustrates a portable information handling system 100 (e.g., a notebook computer, a laptop computer, a tablet computer, a mobile phone, a MP3 player, a personal data assistant (PDA), etc.) including a rechargeable battery and at least one processing device implementing a battery charge control method. It is expressly noted that the IHS configuration shown in FIG. 1 is exemplary only, and that the disclosed methods may be implemented on any type and/or configuration of information handling system having a rechargeable battery. It will be further understood that while certain components of the information handling system are shown in FIG. 1 for illustrating embodiments of the present disclosure, the information handling system disclosed herein is not restricted to including only those components shown in FIG. 1 and described below.

In the example embodiment shown in FIG. 1, IHS 100 includes at least one host processor 105, a memory controller 110 coupled to host processor 105 to facilitate memory functions, a graphics processing unit (GPU) 120 coupled to host processor 105 to facilitate display functions, and a platform controller hub (PCH) 130 coupled to host processor 105 to facilitate input/output (I/O) functions for the information handling system. In the illustrated embodiment, host processor 105 is a silicon-on-chip (SoC) processing device having an integrated memory controller 110, GPU 120 and PCH 130. However, host processor 105 is not restricted to an SoC implementation, and may be configured differently in other embodiments.

Host processor 105 may include substantially any processing device capable of executing program instructions or computer program code. For example, host processor 105 may include various types of programmable integrated circuits (e.g., a processor, controller, microcontroller, microprocessor, ASIC, etc.) or programmable logic devices (e.g., a field programmable gate array "FPGA", complex programmable logic device "CPLD", etc.). In one embodiment, host processor 105 may include at least one central processing unit (CPU) having one or more processing cores. CPU 105 may include any type of processor, such as an Intel Pentium series processor or an Advanced Micro Devices (AMD) processor. In other embodiments, host processor 105 may include other types of processing devices including, but not limited to, a graphics-derivative processor (such as a physics/gaming processor), a digital signal processor (DSP), etc.

In some embodiments, host processor 105 may be controlled by a plurality of power control settings or power limits (e.g., PL1, PL2, PL3 and PL4). During IHS operation, a lower power limit (e.g., PL1) may be applied to host processor 105 for processing average workloads at its base operating frequency. For burst-type operations, the power limits applied to host processor 105 may be temporarily increased (e.g., to PL2, PL3 or PL4) to increase processing speed.

When operating in turbo boost mode, for example, host processor 105 may be enabled to run at a substantially higher clock rate than its base operating frequency (referred to as dynamic processor overclocking) during short periods of high processing demand. During turbo boost, host processor 105 may be allowed to draw significantly more power than the Thermal Design Power (TDP) specified for the processor for short periods of time by adopting a higher power limit (e.g., PL2, PL3 or PL4) than the power limit (e.g., PL1) specified for the processor when processing average workloads.

Memory controller 110 is coupled to host processor 105 to facilitate memory functions between the host processor and system memory 115. System memory 115 may be generally configured to store program instructions and/or data, which is accessible and executable by host processor 105. System memory 115 may be implemented using any suitable memory technology, including but not limited to, random access memory (RAM), static RAM (SRAM), synchronous dynamic RAM (SDRAM), nonvolatile/Flash-type memory, or any other type of memory.

GPU 120 is coupled to host processor 105 to coordinate communication between the host processor and one or more display components of the IHS. In the illustrated embodiment, GPU 120 is coupled to display device 122 (e.g., a display screen or monitor) to provide visual images to the user and one or more display ports 124 to support additional display functions. Display device 122 may be a display screen embedded within the chassis of the IHS, or an external display screen or monitor coupled to the IHS. Display port(s) 124 may include any suitable display port or interface including, but not limited to, a High-Definition Multimedia Interface (HDMI), a DisplayPort (DP) interface and/or a mini DisplayPort (miniDP or mDP) interface. Although integrated with host processor 105 in FIG. 1, GPU 120 may be implemented as a separate integrated circuit chip (coupled to host processor 105 via a bus) when the host processor is not implemented as a silicon-on-chip (SoC) processor.

PCH 130 is coupled to host processor 105 and configured to handle input/output (I/O) operations for the IHS. In some embodiments, PCH 130 may be connected to host processor 105 via a direct media interface (DMI), and may include a plurality of different communication interfaces and ports for communicating with various system components, such as computer readable memory 132, computer readable storage medium 138 and expansion bus(es) 145. Examples of communication interfaces and ports that may be provided within PCH 130 include, but are not limited to, a Peripheral Component Interconnect (PCI) interface, a PCI-Express (PCIe) interface, a Universal Serial Bus (USB) interface, a Serial Peripheral Interface (SPI), an Enhanced SPI (eSPI), a Serial AT Attachment (SATA) interface, a Low Pin Count (LPC) interface, an Inter-IC Sound (I²S) interface, etc. Examples of expansion bus(es) 145 that may be coupled to PCH 130 include, but are not limited to, a PCI bus, a PCIe bus, a SATA bus, a USB bus, etc.

Computer readable memory 132 is coupled to PCH 130 and configured to store software and/or firmware modules. In some embodiments, computer readable memory 132 may be coupled to PCH 130 via an SPI bus, and may include any type of non-volatile memory, such as read-only memory (ROM), Flash memory, and non-volatile random access memory (NVRAM). The software and/or firmware modules stored within computer readable memory 132 may contain program instructions (or computer program code), which may be executed by host processor 105 to instruct components of IHS 100 to perform various tasks and functions for the information handling system. In one example, computer readable memory 132 may be configured to store boot firmware (FW) 134 and Advanced Configuration and Power Interface (ACPI) firmware 136, as shown in FIG. 1.

Boot firmware 134 includes software and/or firmware modules for specifying hardware configuration settings, system time and boot sequence, etc. In some embodiments, boot firmware 134 may include a Basic Input/Output System (BIOS) and/or a Unified Extensible Firmware Interface (UEFI). When IHS 100 is powered on or rebooted, program instructions within boot firmware 134 may be executed by host processor 105 to configure hardware components of the IHS, perform a Power-On Self-Test (POST) to ensure the hardware configuration is valid and working properly, discover and initialize devices, and launch a bootloader to boot an operating system (OS) 140 of the IHS. Once launched, the bootloader within boot firmware 134 may retrieve OS 140 from computer readable storage medium 138 and load it into system memory 115. As described in more detail below, boot firmware 134 may include additional runtime service(s), which may be executable to perform one or more steps of the battery charge control methods disclosed herein.

The Advanced Configuration and Power Interface (ACPI) is an open standard that operating systems use to discover and configure computer hardware components and to perform power management, thermal management and status monitoring. The ACPI specification defines various system states (global "Gx" states and sleep "Sx" states), device states ("Dx" states), processor states ("Cx" states) and power-performance states ("Px" states). The ACPI firmware 136 stored within computer readable storage medium 132 serves as an interface layer between boot firmware 134 and OS 140. For example, when host processor 105 operates in turbo boost mode, OS 140 may communicate with ACPI firmware 136 to request the highest power-performance state (ACPI P0), which provides the maximum operating frequency and is limited only by the electrical (power, current) and thermal limits of host processor 105. A power management unit (PMU) of host processor 105 may allow or deny the request based upon the number of active processor cores, estimated current, estimated power and processor temperature, and may decide if and how much turbo boost will be applied. Turbo boost mode may be allowed as long as host processor 105 remains within its defined current, thermal and power limits (e.g., PL2, PL3 or PL4).

Computer readable storage medium 138 is coupled to PCH 130 and configured to store software and/or data. In some embodiments, computer readable storage medium 138 may be coupled to PCH 130 via a SATA or mini-SATA (mSATA) bus, and may include any type of persistent, non-transitory computer readable storage medium, such as one or more hard disk drives (HDDs) or solid-state drives (SSDs). Computer readable storage medium 138 may be generally configured to store at least one operating system for the IHS (such as OS 140), along with user application(s) and/or user data. OS 140 may contain program instructions (or computer program code), which may be executed by host processor 105 to perform various tasks and functions for the information handling system.

Embedded controller (EC) 150 is coupled to PCH 130 and configured to perform additional functions for the information handling system. In some embodiments, EC 150 may be coupled to PCH 130 via an eSPI or LPC bus, and may be coupled for communicating information to host processor 105 via PCH 130. In addition, EC 150 may be further coupled for communicating with other IHS components, such as Input/Output (I/O) devices 155 and rechargeable battery 160. I/O devices 155 enable the user to interact with the information handling system, and may include, but are not limited to, keyboards, keypads, touch screens, scanning devices, voice or optical recognition devices, and/or other devices suitable for entering or retrieving data to/from the information handling system.

Rechargeable battery 160 may provide primary power to IHS 100 when the IHS is disconnected from an external power source. In addition, rechargeable battery 160 may provide supplemental current/power to the IHS to support processor turbo boost modes and other high discharge rate events. Supplemental power may also be provided by the battery if the system power draw exceeds a power rating specified for an AC adapter 180 coupled for supplying DC power to the IHS. As described in more detail below, EC 150 may communicate with a battery management unit (BMU) 165 of rechargeable battery 160 via a System Management Bus (SMBus) to monitor one or more characteristics of the battery (e.g., battery type, model number, manufacturer, charge rate, charge/discharge current, remaining state of charge, charge termination bit state, temperature and voltage for safe charging, etc.) and to control battery recharge. EC 150 may also communicate this battery state information to host processor 105.

Battery charger and power control circuit 170 provides direct current (DC) power to host processor 105, display 122 and other components of IHS 100 when the IHS is coupled to an external power source (i.e., "plugged in"). In some embodiments, battery charger and power circuit 170 may be coupled to an external source of alternating current (AC) power 190 (e.g., AC mains), and may be configured to convert the AC power received from AC mains 190 into DC power. In other embodiments, battery charger and power control circuit 170 may be coupled to an external source of DC power, such as provided by an external AC adapter 180 coupled to the AC mains 190. AC adapter 180 includes ratings (e.g., a Power Supply ID, "PSID," including voltage, current and power ratings) for safely transforming AC power into DC power.

Rechargeable battery 160 is an internal DC power source that may be used to provide system power for one or more IHS components when IHS 100 is disconnected from AC power source 190 (i.e., when the system is "unplugged"). In addition, rechargeable battery 160 may be used as a supplemental or dual power source when the IHS is connected to the AC power source. For example, rechargeable battery 160 may provide supplemental power to a plugged in system to support turbo boost mode and other high discharge rate events, and/or when an undersized AC adapter 180 is coupled to the IHS, but only configured to support the average current consumption of the system. As used herein, an AC adapter may be "undersized" if the adapter ratings are not sufficient to support peak and/or sustained loads associated with processor turbo boost and other high discharge rate events.

The supplemental power provided by rechargeable battery 160 during turbo boost mode and other high discharge rate events, and/or when an undersized AC adapter is used to support the average current consumption of the system, is referred to herein as a "short duration supplemental power event," since power is provided by the battery for a relatively short duration of time (e.g., <10 ms for peak turbo events and <30 seconds for sustained turbo events). Although short duration supplemental power events may cause a relatively large current (e.g., >150 mA) to be discharged from the battery, these events typically don't draw a lot of energy (e.g., <100 mWh) from the battery or significantly affect battery charge levels (e.g., <0.1% to <2% of the total battery capacity).

In some embodiments, a "short duration supplemental power event" may be defined as various combinations of current (or power) and duration. For example, a "short duration supplemental power event" may occur (and/or be detected by one or more method steps disclosed herein) when rechargeable battery 160 supplies approximately 10 A of discharge current (or 120 W of power) for less than 10 msec to support a peak turbo event, or approximately 5 A of discharge current (or 60 W of power) for less than 20 seconds to support sustained turbo events.

In other embodiments, a "short duration supplemental power event" may be defined as a combination of battery C rate and duration. C rate is a measure of the rate at which a battery is discharged relative to its maximum capacity, and is typically defined as the discharge current divided by the theoretical current draw under which the battery would deliver its nominal rated capacity in one hour. A 1 C rate means that the battery's rated capacity is discharged in 1 hour; a 2 C rate means that the battery's capacity is discharged twice as fast (30 minutes) at twice the discharge current; etc. In terms of C rate, a "short duration supplemental power event" may occur (and/or be detected by one or more method steps disclosed herein) if rechargeable battery 160 supplies up to 4 C rate for less than 10 msec to support a peak turbo event, or up to 2 C rate for less than 30 seconds to support sustained turbo events. It is noted, however, that the examples provided above for expressing short duration supplemental power events in terms of current/power/C rate and duration are provided as examples only and are not intended to restrict the embodiments disclosed herein.

In some embodiments, rechargeable battery 160 may be a smart battery system (SBS) or "smart battery pack" including one or more rechargeable battery packs and a battery management unit (BMU) 165 that may include, for example, an analog front end ("AFE") and microcontroller. The rechargeable battery packs may include any type of rechargeable battery cell(s) or combination thereof that is suitable for recharging. Examples of such battery cells include, but are not limited to, lithium-ion (Li-ion) battery cells, nickel-metal hydride (NiMH) battery cells, nickel cadmium (NiCd) battery cells, lithium-polymer (Li-polymer) battery cells, etc. BMU 165 is a special integrated circuit that monitors characteristics of the battery and reports battery state information (e.g., battery type, model number, manufacturer, charge rate, charge/discharge current, remaining state of charge, charge termination bit state, temperature and voltage for safe charging, etc.) to EC 150 via, for example, a System Management Bus (SMBus).

Figure 2:
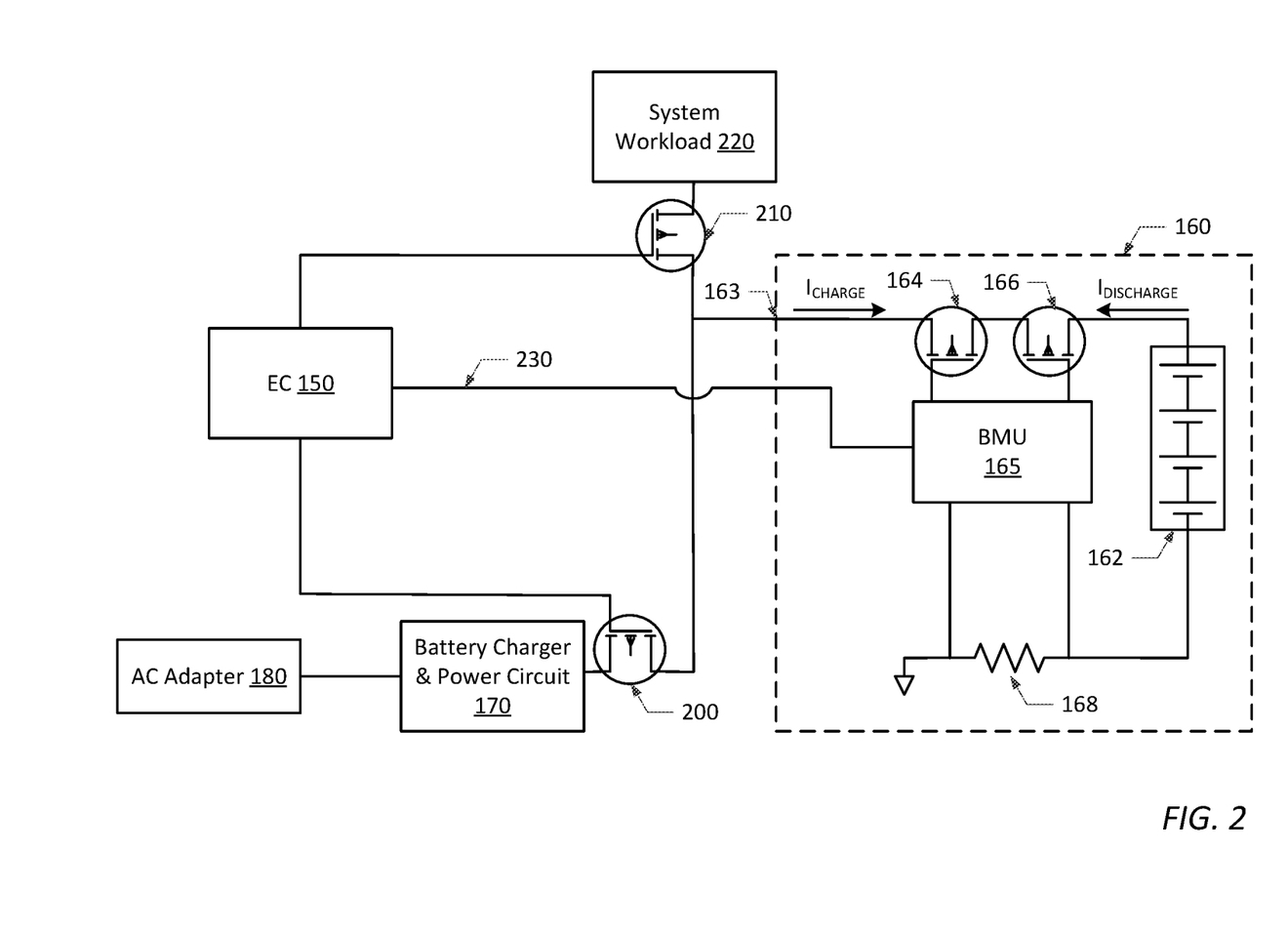
FIG. 2 is a block diagram illustrating details of a rechargeable battery and IHS components responsible for charging and discharging the rechargeable battery.

A block diagram is provided in FIG. 2 to illustrate further details of rechargeable battery 160 and various IHS components responsible for charging and discharging the battery. As shown in FIG. 2, EC 150 controls switching elements 200 and 210, which are coupled to regulate current flow from battery charger and power circuit 170 to system workload 220 and rechargeable battery 160. When battery charger and power circuit 170 and/or AC adapter 180 is connected to an external power source, EC 150 may close switching elements 200 and 210 to provide current flow from the battery charger and power circuit 170 to system workload 220 and/or to rechargeable battery 160. When disconnected from the external power source, switching element 200 may be opened, while switching element 210 remains closed, to regulate charge current ($I_{CHARGE}$) and discharge current ($I_{DISCHARGE}$) flow between system load 220 and rechargeable battery 160. It will be understood that system workload 220 may be an average or peak power demand or an average or peak current demand of one or more system components, such as host processor 105, GPU 120, display 122, storage medium 138, etc. of FIG. 1, and/or may include additional, fewer or alternative system components that draw current. It will be further understood that any other number and/or type of switching elements suitable for controlling current flow between battery charger and power circuit 170, system workload 220 and/or rechargeable battery 160 may alternatively be used.

Although not shown in FIG. 2, rechargeable battery 160 may include logic control circuitry to control and convey battery characteristics (or battery state information) from battery cell circuitry 162 to BMU 165, and to convey control signals from BMU 165 to battery current control circuitry, which controls charging and discharging of the battery cells within battery cell circuitry 162. As noted above, BMU 165 may provide the battery state information to EC 150 via SMBus 230. It will be understood, however, that EC 150 and BMU 165 may be alternatively coupled in signal communication with each other using any other type of data communication bus, or other type of signal communication technology, suitable for transferring data there between.

The battery current control circuitry controls the flow of charge current ($I_{CHARGE}$) to battery cell circuitry 162, and controls the flow of discharge current ($I_{DISCHARGE}$) from battery cell circuitry 162. In the example embodiment shown in FIG. 2, the battery current control circuitry includes two field effect transistors ("FETs") 164 and 166, which are coupled in series between battery charge terminal 163 and battery cell circuitry 162. Charge FET 164 forms a part of the charge circuit that is controlled by components (e.g., microcontroller and/or AFE) of BMU 165 to allow or disallow charge current flow to battery cell circuitry 162. Likewise, discharge FET 166 forms a part of the discharge circuit that is controlled by components (e.g., microcontroller and/or AFE) of BMU 165 to allow or disallow discharge current flow from battery cell circuitry 162. In some embodiments, body diodes may be present across the source and drain of each FET switching element to conduct charge current to the battery cell(s) when the discharge FET 166 is open, and to conduct discharge current from the battery cell(s) when the charge FET 164 is open. It will be understood that the battery current control circuitry of rechargeable battery 160 may include any other number and/or type of charge and discharge switching elements suitable for performing the current control tasks described herein. Examples of suitable switching elements include, but are not limited to, bipolar junction transistors (BJTs) and field effect transistors (FETs).

During normal battery operations, the charge and discharge switching elements 164 and 166 are placed in the closed state by BMU 165, which also monitors the voltage across battery cell circuitry 162. If BMU 165 detects a battery over-voltage condition, BMU 165 opens charge FET 164 to prevent further charging of the battery cell(s) until the over-voltage condition is no longer present. Similarly, if BMU 165 detects a battery under-voltage (or over-discharge) condition, BMU 165 opens discharge FET 166 to prevent further discharging of the battery cell(s) until the under-voltage condition is no longer present. BMU 165 may also open charge FET 164 when the battery pack is in sleep mode. A current sense resistor 168 may be present in the battery pack circuitry to allow BMU 165 to monitor charge current supplied to the battery cell(s). Further information on BMU, battery pack and battery charging operations may be found in U.S. Pat. Nos. 7,378,819, 7,391,184, 8,138,722 and 9,300,015, each of which is incorporated herein by reference in its entirety.

It will be understood that the functions of BMU 165 described herein may be implemented using any circuitry and/or control logic configuration suitable for performing the tasks thereof. For example, in one embodiment, one or more functions of BMU 165 may be implemented using a controller (e.g., a processor and associated firmware) that is integral to rechargeable battery 160 or using any other suitable configuration of microcontroller/microprocessor, firmware and/or software that interfaces with battery pack circuitry/components. It will also be understood that the herein-described tasks of BMU 165 may be performed by a single integrated component, or alternatively, by two or more separate components. Furthermore, it will be understood that the particular configuration of components shown in FIG. 2 is exemplary only and that other configurations of fewer, additional and/or alternative components are possible as are appropriate for a given particular type of battery-powered portable information handling system.

As noted above, information handling systems implement battery charge control methods to recharge the battery when the system is connected to an AC power source. In conventional battery charge control methods, the battery is typically recharged to full power when the remaining state of charge (SOC) drops below a recharge threshold of about 95% and/or when the battery supplies a significant discharge current (e.g., a discharge current greater than or equal to 150 mA) to the system. However, conventional battery charge control methods do not account for short duration supplemental power events, which may occur, e.g., when the battery provides supplemental power during turbo boost mode and other high discharge rate events, and/or when an undersized AC adapter is used to support the average current consumption of the system. In conventional battery charge control methods, short duration supplemental power events may draw a significant discharge current (e.g., >150 mA) for a very short duration of time (e.g., <10 ms for peak turbo events and <30 seconds for sustained turbo events), and thus, may trigger a battery recharge even though these events don't draw a lot of energy (e.g., <100 mWh) from the battery or significantly affect battery charge levels (e.g., <0.1% to <2% of the total battery capacity). In this manner, short duration supplemental power events may cause repeated recharging (or "topping off") of the battery to full charge, which accelerates battery degradation, shortens battery life, and results in the need to replace the batteries more often.

The present disclosure provides embodiments of improved battery charge control methods and information handling systems utilizing such methods. In one respect, the present disclosure provides embodiments of battery charge control methods (shown, e.g., in FIGS. 3 and 4) that dynamically switch between a plurality of battery charging profiles used to control battery recharge. In another respect, the present disclosure provides embodiments of battery charge control methods (shown, e.g., in FIG. 5) for recharging a battery in response to detecting a short duration supplemental power event. As set forth in more detail below, the battery charge control methods described herein improve upon conventional battery charge control methods by identifying a battery discharge as a short term supplemental power event, and in response thereto, dynamically switching to a different battery charging profile to avoid repeatedly recharging the battery to full charge.

It will be understood that one or more of the methodologies described herein may be implemented, e.g., as software or firmware, which is stored on a non-transitory tangible computer readable medium and executed by a processing device (e.g., a CPU, controller, microcontroller, processor, microprocessor, FPGA, ASIC, or other suitable processing device) of an information handling system. In one embodiment, the methodologies described herein may be implemented as program instructions stored, e.g., within boot firmware 134 of computer readable memory 132 and executed by one or more processing devices of IHS 100, such as one or more of host processor 105, EC 150 and BMU 165. In one example, the methodologies described herein may be implemented as a runtime service of boot firmware 134 and executed by host processor 105. In such embodiments, the boot firmware runtime service may receive battery state information from BMU 165 via EC 150, and may use such battery state information (possibly in combination with other inputs) to select a battery charging profile to be used to control battery recharge. In other embodiments, the computer program instructions used to implement one or more of the methodologies described herein may be stored and/or executed primarily within the BMU 165 of rechargeable battery 160.

Figure 3:
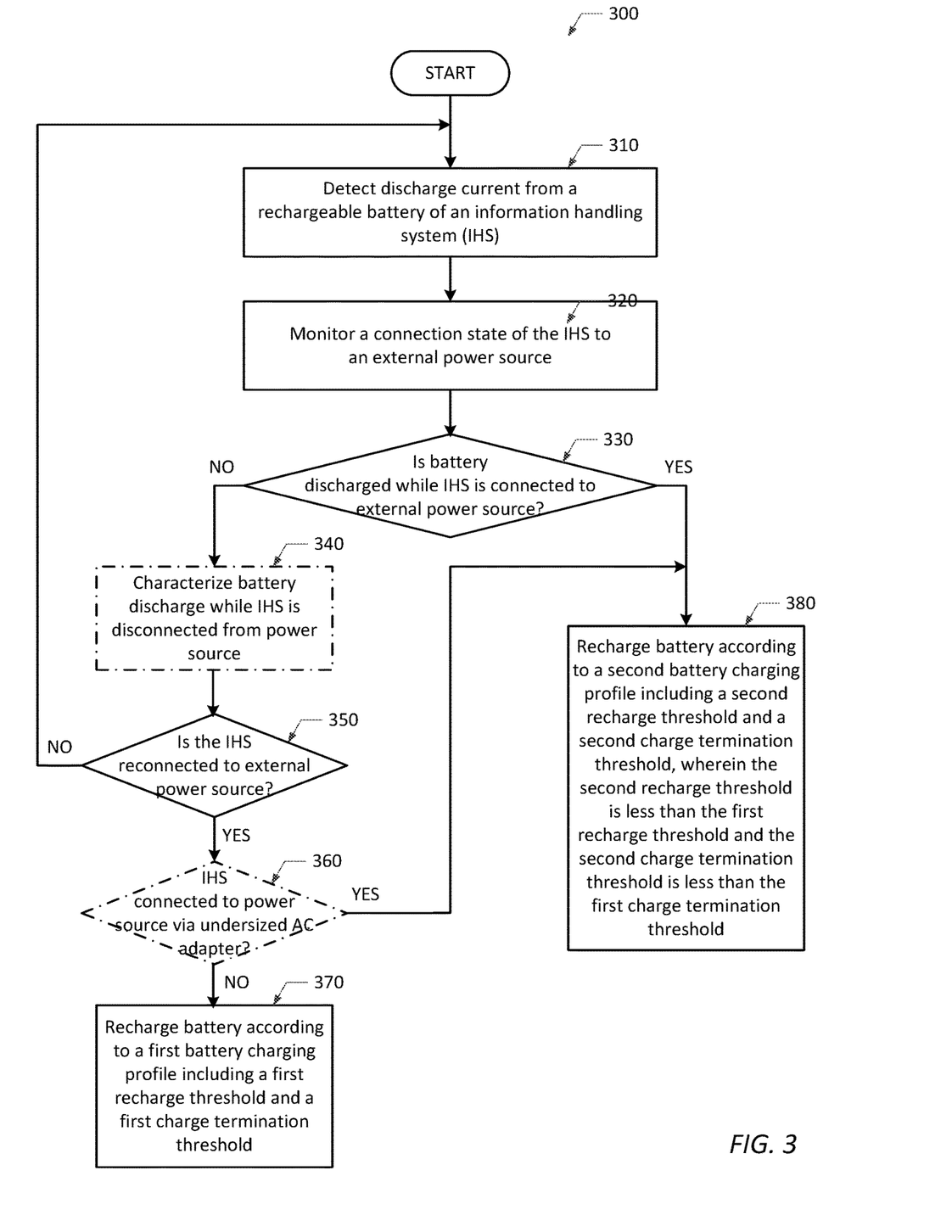
FIG. 3 is a flow chart diagram illustrating one embodiment of a method that may be used by an IHS to dynamically switch between a plurality of battery charging profiles in response to detecting battery discharge while the system is connected to an external power source.

FIG. 3 illustrates one embodiment of a method 300 that may be used by an information handling system to dynamically switch between a plurality of battery charging profiles in response to detecting battery discharge while the system is connected to an external power source. As used herein, a "battery charging profile" may include at least a recharge threshold to begin recharging a battery, and a charge termination threshold to cease battery recharge. In some embodiments, the recharge threshold and the charge termination threshold may each be expressed as a state of charge (SOC) of the battery. As described in more detail below, method 300 may utilize at least a first battery charging profile and a second battery charging profile, each having different recharge thresholds and charge termination thresholds for controlling battery recharge.

In some embodiments, method 300 may begin by detecting discharge current from a rechargeable battery of an information handling system (such as IHS 100) (in step 310). In one example, current may be discharged from the battery to provide primary power the information handling system when the system is disconnected from the external power source. In another example, current may be discharged from the battery to provide supplemental power to the information handling system during turbo boost modes and other high discharge rate events and/or when an undersized AC adapter is used to support the average current consumption of the system. In some embodiments, a discharge current from the battery may be detected (in step 310) when the system load is greater than the peak current limit of an AC adapter supplying power to the IHS. In other embodiments, a discharge current may be detected (in step 310) by the BMU 165 when the information handling system is disconnected from the external power source. In some embodiments, BMU 165 may detect the discharge current from battery cell circuitry 162 (in step 310), and may communicate the detection of discharge current to host processor 105 through EC 150.

In step 320, method 300 monitors a connection state of the information handling system to an external power source. The method may determine, for example, whether the IHS is connected to an external AC power source (e.g., AC mains 190), connected to an external DC power source (e.g., AC adapter 180), or disconnected from an external power source in step 320. In some embodiments, the order of steps 310 and 320 may be reversed, such that the connection state of the IHS to the external power source is determined (in step 320) before the discharge current is detected (in step 310). In some embodiments, EC 150 may monitor the connection state of the IHS to an external power source via battery charger and power circuit 170, and may communicate the connection state to host processor 105.

In step 330, method 300 determines whether or not the battery was discharged while the information handling system is connected to the external power source. If the battery was discharged while the IHS is not connected to the external power source (NO branch of step 330), some embodiments of the method may determine if the IHS has been reconnected to the external power source in step 350. If the IHS remains disconnected from the external power source (NO branch of step 350), indicating that the system is unplugged and the battery is providing primary power to the system components, the method continues to detect discharge current from the battery in step 310.

In some embodiments, the method may characterize battery discharge when the system is unplugged and the battery is providing primary power to the system components (in optional step 340). In one example, the method may identify system turbo behavior, peak loads, sustained loads, etc., and may store this information along with information about the ratings of various AC adapters that may be connected to the IHS at a later time. As set forth below, the method may use the information gained in the optional characterization step to determine which battery charging profile to use when the IHS is reconnected to an external power source.

In some embodiments, the method may recharge the battery according to a first battery charging profile including a first recharge threshold and a first charge termination threshold (in step 370) once the IHS is reconnected to the external power source (YES branch of step 350). In other embodiments, the method may determine if the IHS is connected to the external source via an undersized AC adapter (in optional step 360) may use the AC adapter ratings and the information gained in the optional characterization step 340 to select a battery charging profile. If optional step 360 is included, the method may recharge the battery according to the first battery charging profile if the AC adapter (e.g., a 180 W adapter) is not undersized (NO branch of step 360), and therefore, has the ability to support even maximum turbo events (based on characterization). Alternatively, the method may recharge the battery according to a second battery charging profile (in step 380) if the IHS is connected to an undersized AC adapter (e.g., a 45 W adapter) (YES branch of step 360) and/or heavy turbo usage was identified in the optional characterization step 340. Like the first battery charging profile, the second battery charging profile may include a second recharge threshold and a second charge termination threshold. The method shown in FIG. 3 may also recharge the battery according to the second battery charging profile (in step 380), if the method determines that the battery was discharged while the information handling system is connected to the external power source (YES branch of step 330).

According to one embodiment, the first battery charging profile may recharge the battery when discharge current drawn from the battery causes the battery state of charge (SOC) to fall below the first recharge threshold ($TH_{rc1}$), and may terminate battery charge when the battery SOC reaches the first charge termination threshold ($TH_{ct1}$). Likewise, the second battery charging profile may recharge the battery when discharge current drawn from the battery causes the battery state of charge (SOC) to fall below the second recharge threshold ($TH_{rc2}$), and may terminate battery charge when the battery SOC reaches the second charge termination threshold ($TH_{ct2}$). Example values of the first recharge threshold ($TH_{rc1}$), the first charge termination threshold ($TH_{ct1}$), the second recharge threshold ($TH_{rc2}$), and the second charge termination threshold ($TH_{ct2}$) are shown in the example timing diagram provided in FIG. 6 and described in more detail below.

Figure 6:
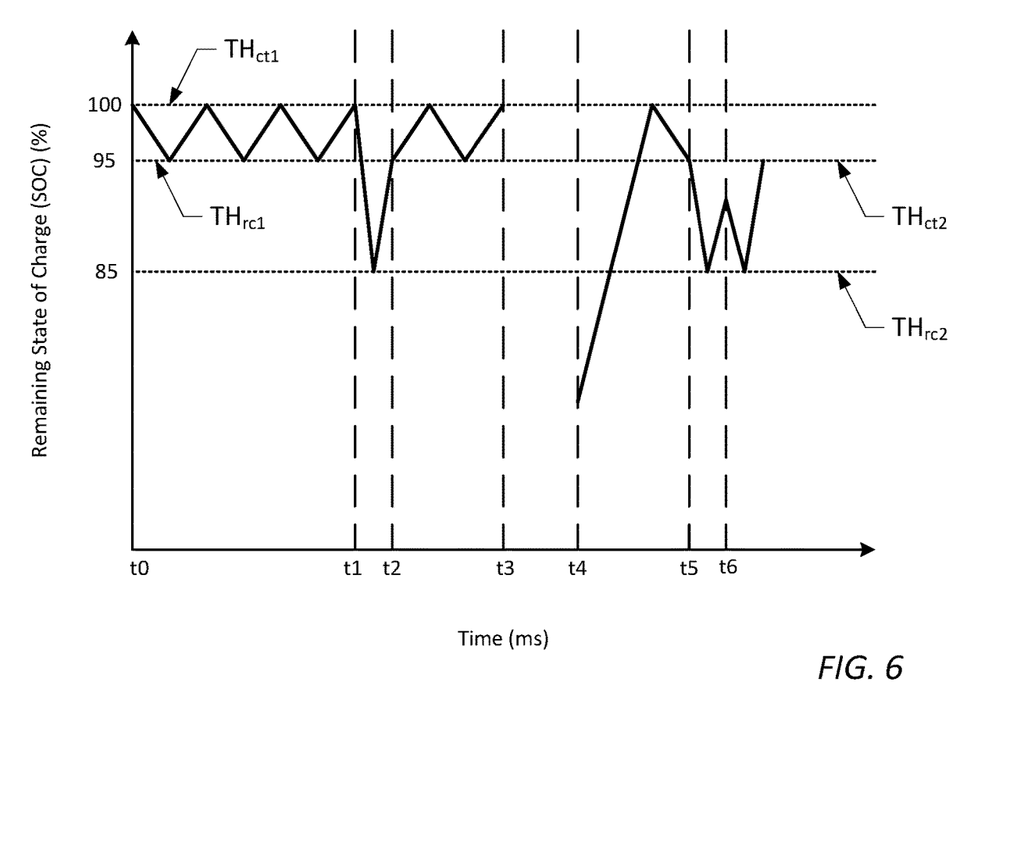
FIG. 6 is an example timing diagram illustrating the methods shown in FIGS. 3-5.

In the battery charge control method shown in FIG. 3 and the example timing diagram shown in FIG. 6, the second recharge threshold ($TH_{rc2}$) is substantially less than the first recharge threshold ($TH_{rc1}$) and the second charge termination threshold ($TH_{ct2}$) is substantially less than the first charge termination threshold ($TH_{ct1}$). By reducing the thresholds ($TH_{rc2}$ and $TH_{ct2}$) used to control battery recharge, the second battery charging profile prevents repeated recharging or topping off of the battery when the system is connected to an external power source.

Figure 4:
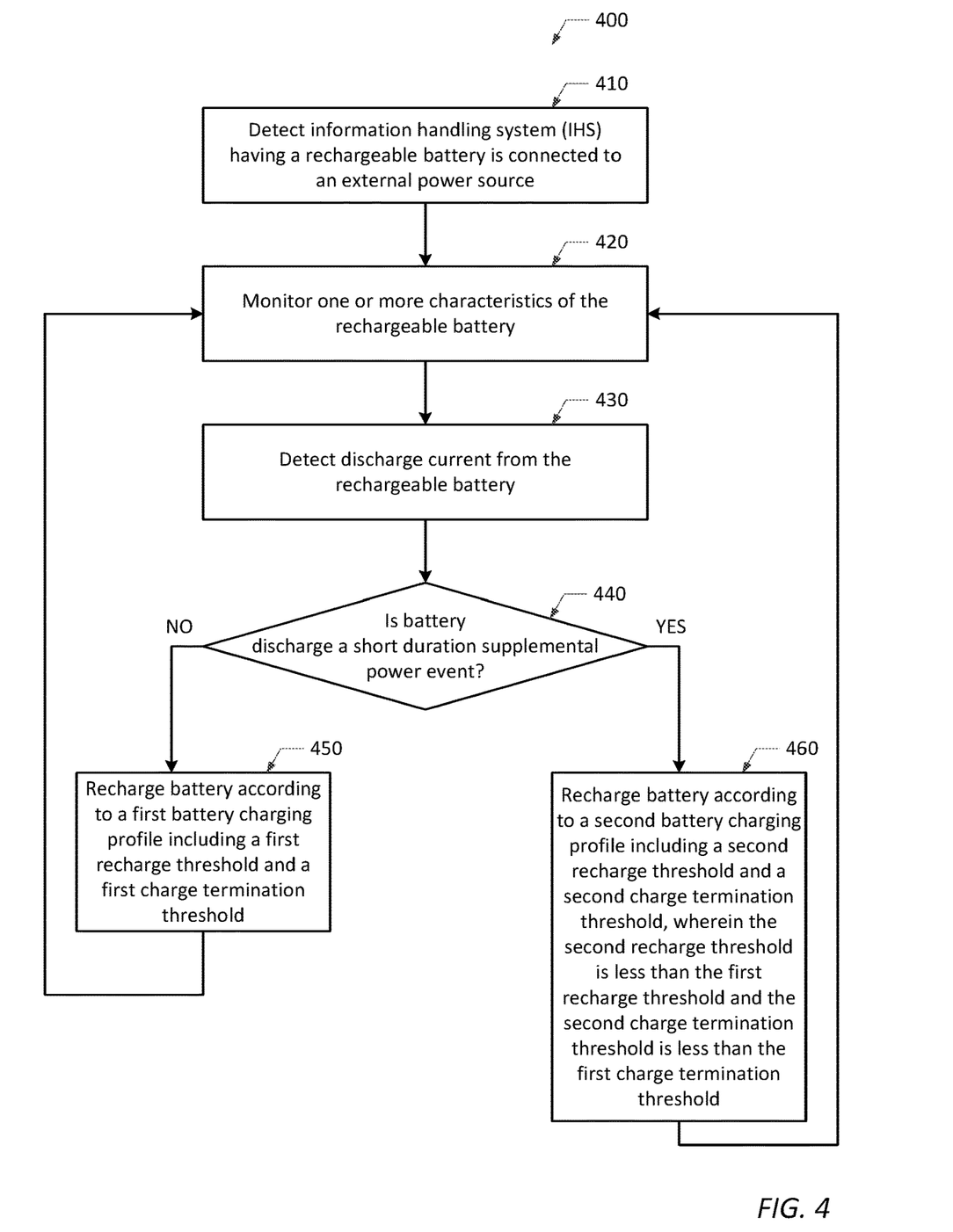
FIG. 4 is a flow chart diagram illustrating one embodiment of a method that may be used by an IHS to dynamically switch between a plurality of battery charging profiles in response to detecting a short duration supplemental power event.

FIG. 4 illustrates one embodiment of a method 400 that may be used by an information handling system to dynamically switch between a plurality of battery charging profiles in response to detecting a short duration supplemental power event. Similar to method 300, method 400 may dynamically switch between a first battery charging profile and a second battery charging profile, each having different recharge thresholds and charge termination thresholds for controlling battery recharge. Unlike method 300, however, method 400 may begin after an information handling system having a rechargeable battery is connected to an external power source.

In step 410, method 400 detects that an IHS having a rechargeable battery is connected to an external power source. For example, the method may detect IHS 100 is connected to an external AC power source (e.g., AC mains 190) or to an external DC power source (e.g., AC adapter 180) in step 410. In some embodiments, EC 150 may detect that IHS is connected to an external power source via battery charger and power circuit 170, and may communicate the detection to host processor 105.

In step 420, method 400 monitors one or more characteristics of the rechargeable battery. Battery characteristics monitored in step 420 may include, but are not limited to, battery type, model number, manufacturer, charge rate, charge/discharge current, remaining state of charge (SOC), charge termination bit state, temperature and voltage for safe charging, etc. In one example embodiment, BMU 165 of rechargeable battery 160 may monitor battery characteristic(s) in step 420 and may report battery state information to EC 150 via System Management Bus (SMBus) 230. EC 150 may then communicate the battery state information to host processor 105. In another example embodiment, EC 150 and/or host processor 105 may communicate directly with BMU 165 to monitor one or more characteristics of the battery in step 420.

Next, method 400 may detect discharge current from the battery (in step 430) and determine if the battery discharge is a short duration supplemental power event (in step 440). As noted above, a "short duration supplemental power event" may occur when supplemental power is provided by the battery for a relatively short duration of time. These events may occur, for example, during turbo boost mode and other high discharge rate events, and/or when an undersized AC adapter is used to support the average current consumption of the system. In one example embodiment, BMU 165, EC 150 or processor 105 may detect discharge current from the battery (in step 430) and determine if the battery discharge is a short duration supplemental power event (in step 440) based, at least in part, on the battery characteristics monitored in step 420 and reported to EC 150.

For example, the battery discharge may be considered a "short duration supplemental power event" if the battery supplies approximately 10 A of discharge current (or 120 W of power) for less than 10 msec to support a peak turbo event, or approximately 5 A of discharge current (or 60 W of power) for less than 20 seconds to support sustained turbo events. Alternatively, the battery discharge may be considered a "short duration supplemental power event" if the battery supplies up to 4 C rate for less than 10 msec to support a peak turbo event, or up to 2 C rate for less than 30 seconds to support sustained turbo events. It is noted, however, that the examples provided above for expressing short duration supplemental power events in terms of current/power/C rate and duration are provided as examples only and are not intended to restrict the embodiments disclosed herein.

If the battery discharge is not a short duration supplemental power event (NO branch of step 440), the method recharges the battery according to a first battery charging profile including a first recharge threshold and a first charge termination threshold (in step 450). On the other hand, if the method determines that the battery discharge is a short duration supplemental power event (YES branch of step 440), the method recharges the battery according to a second battery charging profile including a second recharge threshold and a second charge termination threshold (in step 460).

According to one embodiment, the first battery charging profile may recharge the battery when discharge current drawn from the battery causes the battery state of charge (SOC) to fall below a first recharge threshold ($TH_{rc1}$), and may terminate battery charge when the battery SOC reaches a first charge termination threshold ($TH_{ct1}$) Likewise, the second battery charging profile may recharge the battery when discharge current drawn from the battery causes the battery state of charge (SOC) to fall below a second recharge threshold ($TH_{rc2}$), and may terminate battery charge when the battery SOC reaches a second charge termination threshold ($TH_{ct2}$). Example values of the first recharge threshold ($TH_{rc1}$), the first charge termination threshold ($TH_{ct1}$), the second recharge threshold ($TH_{rc2}$), and the second charge termination threshold ($TH_{ct2}$) are shown in the example timing diagram provided in FIG. 6 and described in more detail below.

In the battery charge control method shown in FIG. 4 and the example timing diagram shown in FIG. 6, the second recharge threshold ($TH_{rc2}$) is substantially less than the first recharge threshold ($TH_{rc1}$) and the second charge termination threshold ($TH_{ct2}$) is substantially less than the first charge termination threshold ($TH_{ct1}$). By reducing the thresholds ($TH_{rc2}$ and $TH_{ct2}$) used to control battery recharge, the second battery charging profile prevents repeated recharging or topping off of the battery during short duration supplemental power events.

Figure 5:
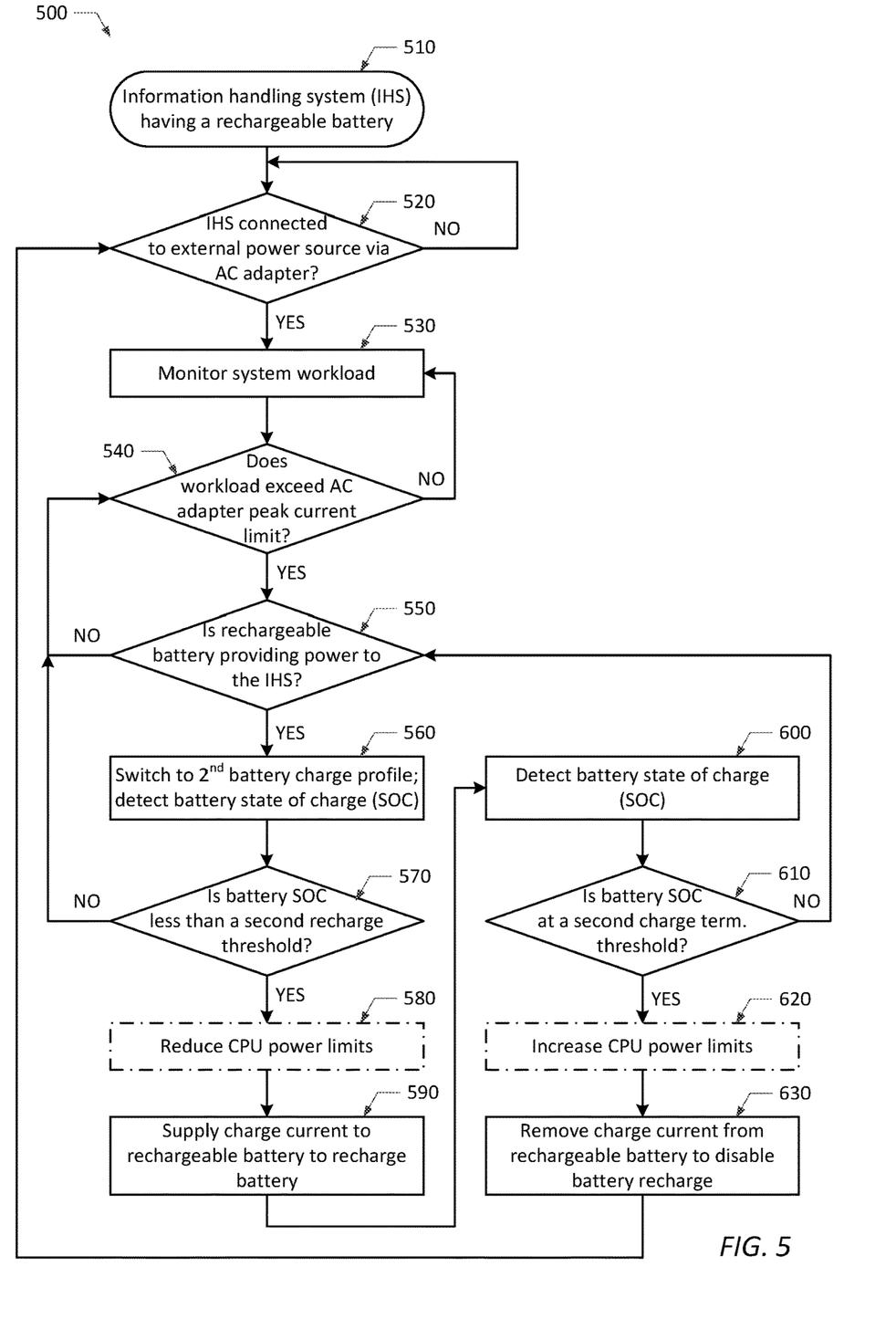
FIG. 5 is a flow chart diagram illustrating one embodiment of a method that may be used by an IHS to recharge a battery in response to detecting a short duration supplemental power event.

FIG. 5 illustrates one embodiment of a method 500 that may be used by an information handling system to recharge a rechargeable battery in response to detecting short duration supplemental power event(s). In some embodiments, method 500 may begin by providing an information handling system (IHS) having a rechargeable battery (in step 510), and detecting whether the IHS is connected to an external power source via an AC adapter (in step 520). In some embodiments, the method may continue to monitor the connection state of the IHS to the external power source (in step 520) if no connection is detected (NO branch of step 520).

If connection to an external power source is detected (YES branch of step 520), method 500 monitors the system workload (in step 530) and determines if the system workload exceeds a peak current limit of the AC adapter (in step 540). The system workload (e.g., system workload 220, FIG.

2) may be an average or peak power demand, or an average or peak current demand, of one or more system components (e.g., host processor 105, GPU 120, display 122, storage medium 138, etc.). If the system workload does not exceed the peak current limit of the AC adapter (NO branch of step 540), the method continues to monitor the system workload in step 530. If the system workload does exceed the peak current limit of the AC adapter (YES branch of step 540), the method determines whether or not the rechargeable battery is discharging current to one or more system components to provide supplemental power to the IHS (in step 550). The method returns to step 540 if the battery is not providing supplemental power to the IHS (NO branch of step 550), and continues to step 560 if supplemental power is provided by the battery (YES branch of step 550).

A short duration supplemental power event is detected, or at least presumed to have occurred, if the method determines that the system workload exceeds the peak current limit of the AC adapter (in step 540) and determines that the battery is providing supplemental power to the IHS (in step 550). In response to detecting a short duration supplemental power event, the method switches to the second battery charging profile and detects the state of charge (SOC) of the battery (in step 560). The second battery charging profile may include a second recharge threshold and a second charge termination threshold, as described above.

Next, the method determines whether the battery SOC is less than the second recharge threshold (in step 570). As noted above and shown in FIG. 6, the second recharge threshold ($TH_{rc2}$) may be substantially less than a first recharge threshold ($TH_{rc1}$), which may be used to initiate battery recharge under different circumstances. If the battery SOC is greater than the second recharge threshold (NO branch of step 570), the method returns to step 540; otherwise, the method continues to optional step 580 and method step 590.

In step 590, the method supplies charge current to the rechargeable battery to recharge the battery. In some embodiments, the method may reduce processor power limits in optional step 580 to suppress processor turbo events while the battery is being recharged. In one example, the PL2 and/or PL4 power limits specified for host processor 105 may be reduced in optional step 580 to match the power rating specified for AC adaptor 180. In other embodiments, however, battery discharge may remain enabled while the battery is charging in step 590. For example, charge current may be supplied to the battery in step 590 as long as the system power draw is below the adapter rating. If the system power spikes above the adapter rating, the power supplied to the battery would drop to zero and the battery would discharge.

The method may detect the battery SOC (in step 600) while the battery is being recharged, and may continue to supply charge current (in step 590) until the battery SOC reaches a second charge termination threshold (in step 610). As noted above and shown in FIG. 6, the second charge termination threshold ($TH_{ct2}$) may be substantially less than a first charge termination threshold ($TH_{ct1}$), which may be used to terminate battery recharge under different circumstances.

If the battery SOC does not meet the second charge termination threshold (NO branch of step 610), the method may return to step 550 to determine if the battery is still being used to provide supplemental power to the information handling system. If so, the battery may continue to provide discharge current to support the system workload, and receive a charge current to recharge the battery, if the battery SOC again falls below the second recharge threshold (in steps 560-590).

If the battery SOC reaches the second charge termination threshold (YES branch of step 610), the method removes the charge current from the rechargeable battery to disable battery recharge (in step 630). In some embodiments, the method may increase processor power limits (in optional step 620) to enable support for processor turbo events prior to (or after) removing the charge current (in step 630). In one example, the method may increase the PL2 and/or PL4 power limits back to the default or previous limits specified for the host processor 105 (in optional step 620). Once the charge current is removed from the battery to disable battery recharge (in step 630), the method may return to step 520 to continue monitoring the connection state of the IHS to an external power source.

FIG. 6 provides an example timing diagram illustrating the remaining state of charge (SOC) of a rechargeable battery over time. The example timing diagram shown in FIG. 6 is used herein to explain how the methods shown in FIGS. 3-5 can be used by an information handling system to dynamically switch between a first battery charging profile and a second battery charging profile, each having different recharge thresholds and charge termination thresholds for controlling battery recharge.

As shown in FIG. 6, for example, a first battery charging profile may be used by the disclosed systems and methods to recharge the rechargeable battery from time t0 to time t1. In the present disclosure, the first battery charging profile may be used to recharge the battery if: (a) the battery is used to power the information handling system while the system is disconnected (i.e., "unplugged") from an external power source (FIG. 3), or (b) the battery is discharged to provide supplemental power to the system while the system is connected (i.e., "plugged in") to the external power source, but the battery discharge is not considered to be a short duration supplemental power event (FIGS. 4 and 5). As noted above, the first battery charging profile may be used to recharge the battery when discharge current drawn from the battery causes the battery state of charge (SOC) to fall below a first recharge threshold ($TH_{rc1}$), and may terminate battery recharge when the battery SOC reaches a first charge termination threshold ($TH_{ct1}$). It is noted that, while the first recharge threshold ($TH_{rc1}$) is depicted as 95% SOC and the first charge termination threshold ($TH_{ct1}$) is depicted as 100% SOC in the illustrated example, other threshold values may be alternatively used without departing from the scope of the present disclosure. For example, the first recharge threshold ($TH_{rc1}$) may be substantially any SOC between approximately 90% and 95% without departing from the scope of the present disclosure.

At time t1, the systems and methods described herein dynamically switch to a second battery charging profile, which is used to recharge the rechargeable battery from time t1 to time t2. In the present disclosure, the disclosed systems and methods may switch to the second battery charging profile if: (a) the battery is discharged while the information handling system is connected to an external power source (FIG. 3), (b) the battery is discharged while the information handling system is disconnected from an external power source and later reconnected to the external power source via an undersized AC adapter (FIG. 3) and/or (c) the battery discharge is considered to be a short duration supplemental power event (FIGS. 4 and 5). As noted above, the second battery charging profile may recharge the battery when discharge current drawn from the battery causes the battery state of charge (SOC) to fall below a second recharge threshold ($TH_{rc2}$), and may terminate battery recharge if and when the battery SOC reaches a second charge termination threshold ($TH_{ct2}$).

In the example shown in FIG. 6, the second recharge threshold ($TH_{rc2}$) is depicted as 85% SOC and the second charge termination threshold ($TH_{ct2}$) is depicted as 95% SOC. It is noted that, although the second charge termination threshold ($TH_{ct2}$) and the first recharge threshold ($TH_{rc1}$) are shown to be equal in the illustrated embodiment ($TH_{ct2}=TH_{rc1}=95\%$ SOC), the present disclosure is not limited to such, and $TH_{ct2}$ may be substantially less $TH_{rc1}$, in other embodiments. It is further noted, that other threshold values not specifically shown in FIG. 6 may be used without departing from the scope of the present disclosure as long as $TH_{rc2}<TH_{ct2}$, $TH_{rc2}<TH_{rc1}$ and $TH_{ct2}<TH_{ct1}$.

For example, the second recharge threshold ($TH_{rc2}$) may be substantially any SOC between about 75% and 90%, and the second charge termination threshold ($TH_{ct2}$) may be substantially any SOC between approximately 85% and 95%, as long as $TH_{rc2}<TH_{ct2}$. By setting $TH_{rc2}<TH_{rc1}$, the disclosed systems and methods enable the battery to support short duration supplemental power events without triggering a battery recharge as frequently. By setting $TH_{ct2}<TH_{ct1}$, the disclosed systems and methods avoid repeated recharging (or topping off) of the battery at high SOC (e.g., greater than 95%), which is known to accelerate battery degradation, shorten battery life, and result in the need to replace the batteries more often.

At time t2, the disclosed systems and methods dynamically switch back to the first battery charging profile if the battery is discharged to provide supplemental power to the system, but the battery discharge is no longer considered to be a short duration supplemental power event (FIGS. 4 and 5). In some cases, the first battery charging profile may be used to recharge the battery until time t3 when the information handling system is disconnected (i.e., "unplugged") from the external power source.

At time t4, the information handling system is reconnected (i.e., "plugged in") to the external power source. Since the battery is used as the primary power source while the system was unplugged, the battery SOC may be relatively low (e.g., 45% SOC) when the system is reconnected to the external power source at time t4. In some embodiments, the battery may be recharged according to the first battery charging profile from time t4 to time t5 once the system is reconnected to the external power source, as shown in FIG. 6. In other embodiments, the battery discharge that occurs when the system is unplugged and the battery is providing primary power to the system components may be characterized (see, e.g., optional step 340 of FIG. 3), and the information gained in the optional characterization step may be used to determine which battery charging profile to use when the IHS is reconnected to an external power source at time t4.

At time t5, the disclosed systems and methods again dynamically switch to the second battery charging profile in response to detecting battery discharge while the system is plugged in (FIG. 3) or in response to detecting a short duration supplemental power event (FIGS. 4 and 5). At time t6, however, the disclosed systems and methods determine that the battery SOC fails to meet the second charge termination threshold ($TH_{ct2}$), as illustrated by the NO branch of step 600 of the method shown in FIG. 5. When this occurs, the battery may continue to discharge current until the battery SOC meets or falls below the second recharge threshold ($TH_{rc2}$). When the second recharge threshold is met, the battery is recharged to the second charge termination threshold ($TH_{ct2}$), according to the second battery charging profile.

It will be understood that the illustrated steps of the methods shown in FIGS. 3-5 are exemplary only, and that any other combination of additional and/or alternative steps may be employed that are suitable for dynamically switching between a plurality of battery charging profiles for recharging a battery and/or for recharging a battery in response to detecting a short duration supplemental power event.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system (IHS), comprising:
    a rechargeable battery including one or more battery cells;
    a battery charger and power circuit coupled to receive current from an external power source and coupled to supply a charge current to the one or more battery cells for recharging the rechargeable battery in accordance with a battery charging profile when the IHS is coupled to the external power source; and
    one or more processing devices configured to execute program instructions stored on a non-transitory tangible computer readable medium to switch from using a first battery charging profile to using a second battery charging profile to recharge the rechargeable battery in response to at least one of the following: detecting a discharge current from the one or more battery cells while the IHS is coupled to the external power source or determining that the discharge current is a short term supplemental power event.

2. An information handling system (IHS), comprising:
    a rechargeable battery including one or more battery cells;
    a battery charger and power circuit coupled to receive current from an external power source and coupled to supply a charge current to the one or more battery cells for recharging the rechargeable battery in accordance with a battery charging profile when the IHS is coupled to the external power source; and
    one or more processing devices configured to execute program instructions stored on a non-transitory tangible computer readable medium to switch from using a first battery charging profile to using a second battery charging profile to recharge the rechargeable battery in response to at least one of the following: detecting a discharge current from the one or more battery cells while the IHS is coupled to the external power source or determining that the discharge current is a short term supplemental power event;
    wherein the first battery charging profile includes a first recharge threshold and a first charge termination threshold, wherein the second battery charging profile includes a second recharge threshold and a second charge termination threshold, and wherein the second recharge threshold is less than the first recharge threshold and the second charge termination threshold is less than the first charge termination threshold.

3. The information handling system as recited in claim 2, wherein the second charge termination threshold is less than or equal to the first recharge threshold.

4. The information handling system as recited in claim 1, wherein the one or more processing devices are further configured to execute program instructions stored on the non-transitory tangible computer readable medium to:
monitor a connection state of the IHS to the external power source;
detect a discharge current from the one or more battery cells;
determine if the discharge current is detected while the IHS is connected to the external power source; and
utilize the first battery charging profile to recharge the rechargeable battery if the discharge current is detected while the IHS is disconnected from the external power source.

5. The information handling system as recited in claim 1, wherein the one or more processing devices are further configured to execute program instructions stored on the non-transitory tangible computer readable medium to:
monitor one or more characteristics of the rechargeable battery;
detect a discharge current from the one or more battery cells;
determine if the discharge current is a short term supplemental power event based, at least in part, on the one or more characteristics; and
utilize the first battery charging profile to recharge the rechargeable battery if the discharge current is not a short term supplemental power event.

6. The information handling system as recited in claim 1, wherein the one or more processing devices comprise one or more of a host processor of the IHS, an embedded controller of the IHS and a battery management unit (BMU) of the rechargeable battery.

7. The information handling system as recited in claim 1, further comprising a non-volatile computer readable memory configured to store boot firmware, wherein the program instructions stored on the non-transitory tangible computer readable medium and executed by the one or more processing devices comprise a runtime service of the boot firmware.

8. A method for dynamically switching between a plurality of battery charging profiles, the method comprising:
detecting discharge current from a rechargeable battery of an information handling system (IHS);
determining whether or not the IHS is coupled to an external power source; and
switching from using a first battery charging profile to using a second battery charging profile to recharge the rechargeable battery in response to at least one of the following: detecting the discharge current while the IHS is coupled to the external power source or determining that the discharge current is a short term supplemental power event.

9. A method for dynamically switching between a plurality of battery charging profiles, the method comprising:
detecting discharge current from a rechargeable battery of an information handling system (IHS);
determining whether or not the IHS is coupled to an external power source; and
switching from using a first battery charging profile to using a second battery charging profile to recharge the rechargeable battery in response to one or more of the following: detecting the discharge current while the IHS is coupled to the external power source or determining that the discharge current is a short term supplemental power event;
wherein the first battery charging profile includes a first recharge threshold and a first charge termination threshold, wherein the second battery charging profile includes a second recharge threshold and a second charge termination threshold, and wherein the second recharge threshold is less than the first recharge threshold and the second charge termination threshold is less than the first charge termination threshold.

10. The method as recited in claim 9, wherein the second charge termination threshold is less than or equal to the first recharge threshold.

11. The method as recited in claim 8, wherein if the discharge current is detected while the IHS is disconnected from the external power source, the method further comprises using the first battery charging profile to recharge the rechargeable battery once the IHS is reconnected to the external power source.

12. The method as recited in claim 8, further comprising:
monitoring one or more characteristics of the rechargeable battery;
determining if the discharge current is a short term supplemental power event based, at least in part, on the one or more characteristics; and
using the first battery charging profile to recharge the rechargeable battery if the discharge current is not a short term supplemental power event.

\* \* \* \* \*